Jan. 4, 1927.  
J. G. MACLAREN  
1,613,565  
CARRIER DISTRIBUTING APPARATUS  
Filed Sept. 3, 1925  
4 Sheets-Sheet 2
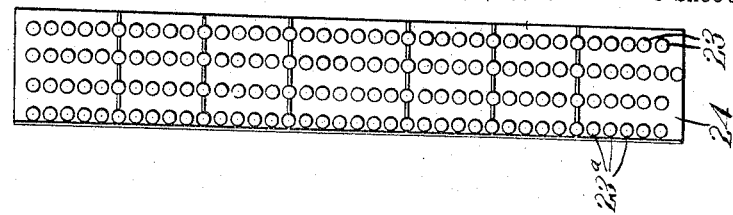
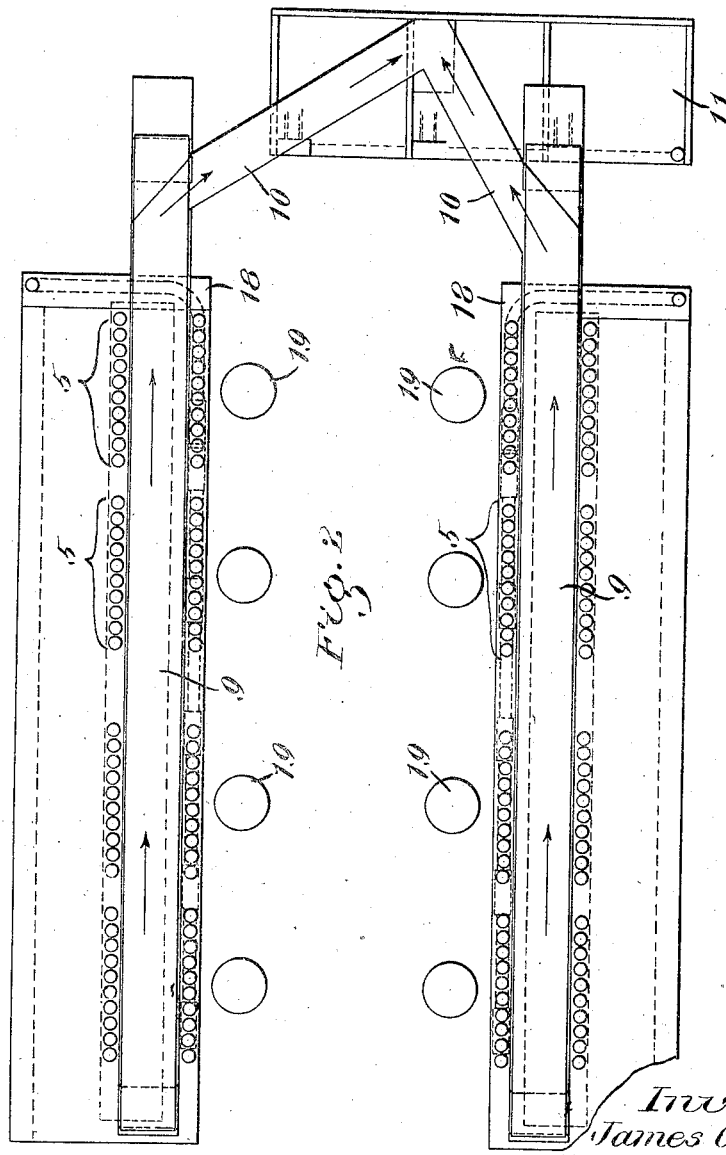
Fig. 2
Inventor  
James G. Maclaren  
by Roberts Roberts  
Att'ys.

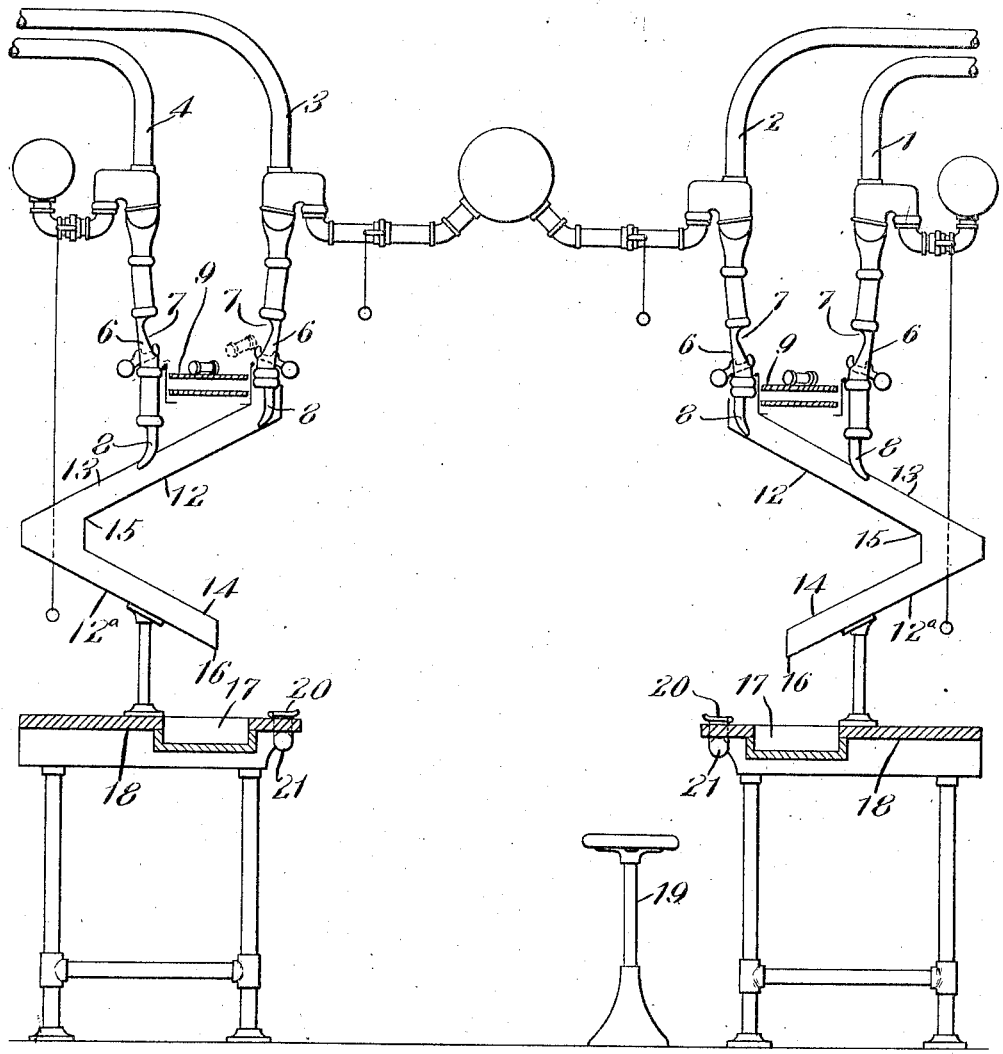

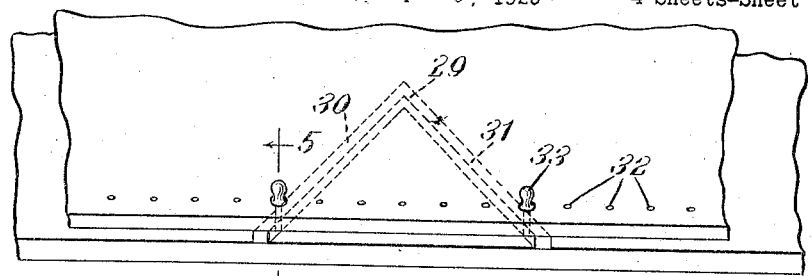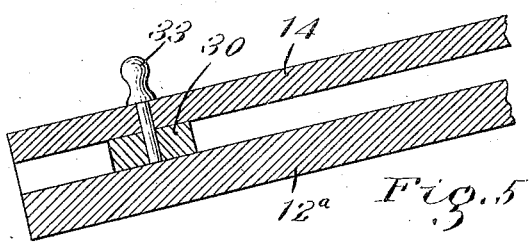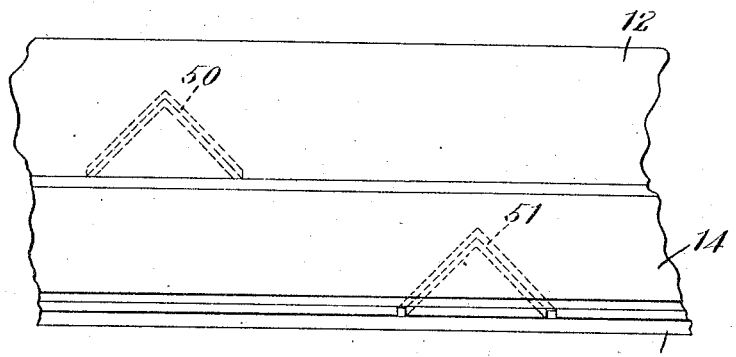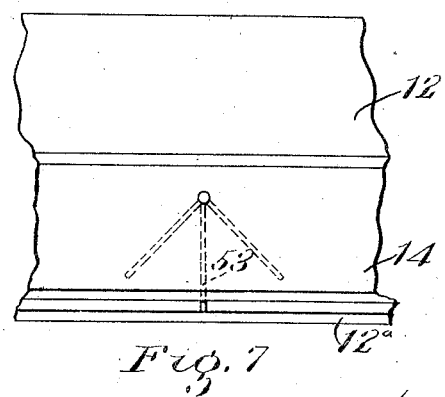

Patented Jan. 4, 1927.

1,613,565

UNITED STATES PATENT OFFICE.

JAMES G. MACLAREN, OF SYRACUSE, NEW YORK, ASSIGNOR TO THE LAMSON COMPANY, OF SYRACUSE, NEW YORK, A CORPORATION OF MASSACHUSETTS.

CARRIER-DISTRIBUTING APPARATUS.

Application filed September 3, 1925. Serial No. 54,248.

This invention pertains to carrier despatch systems and more particularly to apparatus for equalizing the distribution of carriers among the several operators stationed at the central station of such a system.

Store service carrier despatch systems commonly comprise a central station desk to which carriers are sent from outlying or clerks' stations. The operators are seated at the central station desk and the incoming carriers are delivered to the operators who perform the necessary transactions of making change, authorizing charge sales, etc., and who then return the carriers either directly to the stations from which they were originally sent or to a despatch operator who in turn sends them to the proper outlying stations. Usually the charge and cash carriers are separated automatically as they arrive at the central station and delivered to different operators or groups of operators.

Each operator is expected to perform substantially the same number of transactions in a given period and accordingly the delivery terminals for incoming carriers are usually so grouped that the number of carriers arriving through any group, taking into account the greater activity of some outlying stations as compared with others, is normally substantially equal to the number of carriers arriving through any other group.

As the activity of the several outlying stations or groups of stations is not constant but varies very substantially from time to time the intended equal distribution of arriving carriers is thus often frustrated.

In accordance with the present invention I provide distributing means associated with the carrier delivering terminals at the central station comprising adjustable elements which may be positioned at will to direct carriers arriving through a greater or lesser number of delivery terminals to the station of a given operator so that irrespective of the varying degree of activity of an outlying station or group of stations a substantially equal number of carriers may at all times be delivered to each operator.

As a concrete example of the practical application of the present invention I have herein shown and described it as embodied in a pneumatic despatch store service system although in its broader aspects it is not confined to this specific environment.

In the accompanying drawings, in which a preferred embodiment of the invention has been illustrated by way of example:—

Fig. 2 is a plan view of the apparatus shown in Fig. 1;

Fig. 3 is a vertical section to somewhat larger scale substantially on the line 3—3 of Fig. 1;

Fig. 4 is a fragmentary front elevation to larger scale showing the lower portion of a delivery chute forming an element of the improved device;

Fig. 5 is a fragmentary vertical section on the line 5—5 of Fig. 4;

Fig. 6 is a view similar to Fig. 4, but to smaller scale, illustrating a modified arrangement, and Fig. 7 is a similar view illustrating a further modification.

Figure 1:
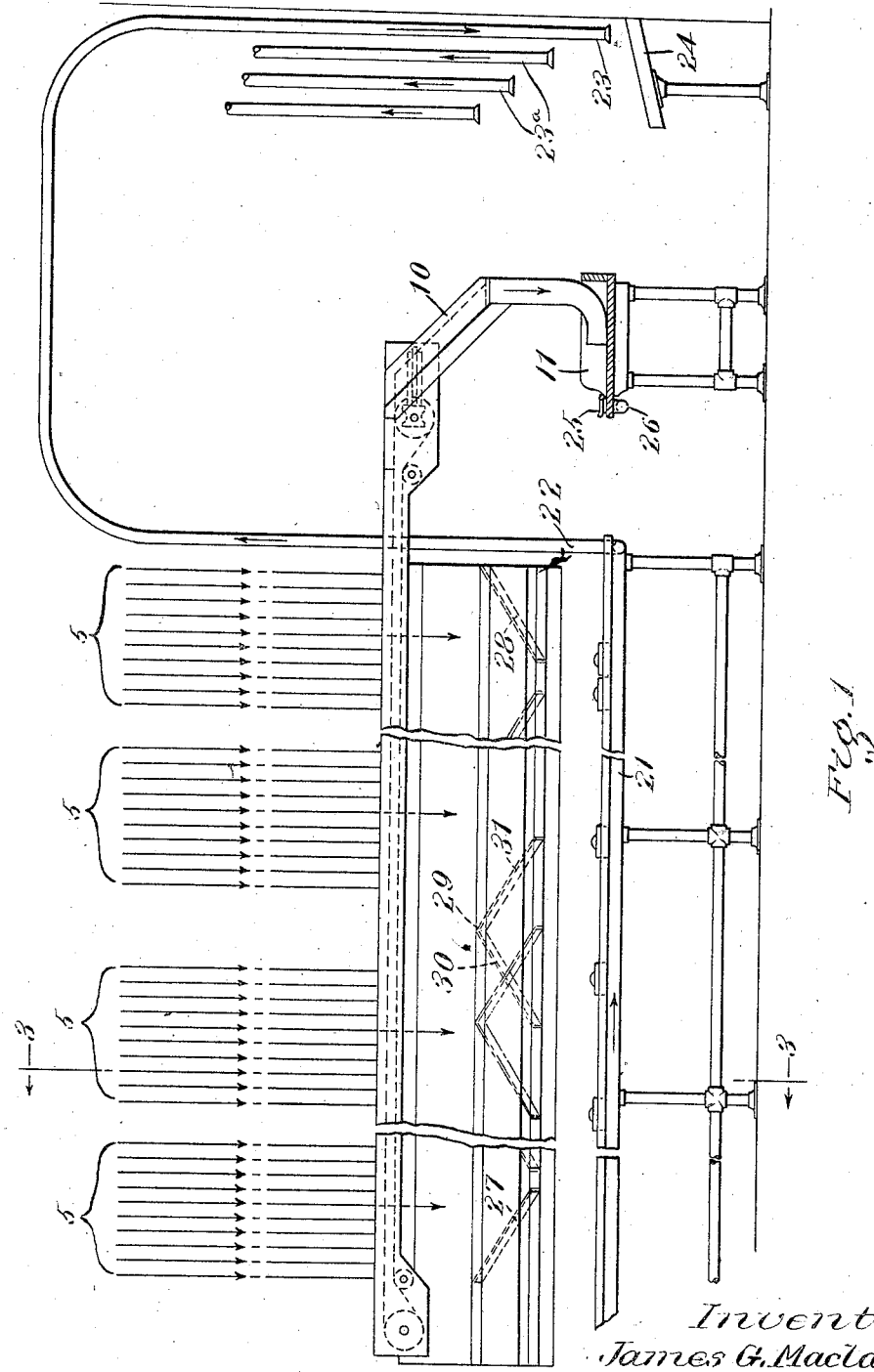
Fig. 1 is a side elevation, partly diagrammatic and partly in section, showing a central station apparatus embodying the present invention and comprising two substantially like desk units for the accommodation of cashiers.

Referring to the drawings, the numeral 1 designates a longitudinally extending row of carrier transmission tubes of the usual type employed in pneumatic despatch systems and which lead from outlying or clerks' stations. A second row of tubes 2 is arranged parallel to the row 1 and horizontally spaced from the latter. These two parallel rows of tubes ordinarily suffice to deliver the desired number of carriers to a single desk although one of these rows of tubes may be omitted or additional rows may be furnished as circumstances may require.

In the present disclosure two substantially duplicate desk units are shown, the rows 1 and 2 of tubes corresponding to one of these desk units. A second pair of rows 3 and 4 of tubes also coming from outlying stations is arranged to deliver carriers to the second desk unit. Obviously other desk units with corresponding rows of delivery tubes may be provided within the central station as the needs of the establishment may require.

As indicated diagrammatically in Fig. 1 the tubes of the rows 1—2, 3—4, respectively, are divided into groups 5 each of which contains a sufficient number of tubes normally to deliver the desired number of carriers to a single operator. The number of tubes in the various groups may differ in accordance with the activity of the respective outlying stations which are served by these tubes.

Each of the tubes of each of the several rows is provided with a separator device 6 of any suitable type adapted to separate the carriers into classes in accordance with some external characteristic of the carriers. These separators are provided with outlets 7 through which the charge carriers are delivered, and with other outlets 8 for the delivery of the cash carriers.

A horizontal conveyor belt 9 is arranged in the space between the separator terminals of the tubes of the rows 1 and 2 and a similar conveyor belt is disposed between the delivery terminals of the tubes of the rows 3 and 4. The belt 9 receives all of the charge carriers from the tubes of rows 1 and 2 and moves them longitudinally of the desk and deposits them in an inclined chute 10. A similar chute 10 receives the charge carriers delivered through the tubes 3 and 4 and the two chutes 10 deposit their charge carriers upon a charge authorizer's desk 11.

The terminals 8, from which cash carriers arriving through the tubes 1 and 2 are delivered, deposit their carriers in an inclined chute comprising the upper downwardly and rearwardly inclined floor member 12 and the lower forwardly and downwardly inclined floor 12ª. The floors 12 and 12ª extend along the entire series of delivery terminals 8 so that all of the carriers delivered by these terminals fall upon the upper floor 12 of the chute and after sliding down the latter drop onto the lower floor 12ª and continue their downward movement.

Preferably a cover 13 is spaced vertically above the floor member 12 of the chute so as to provide a closed channel or passage for the carriers. Likewise a cover 14 is spaced above the bottom floor member 12ª providing a closed passage for the carriers as they slide down the lower part of the chute. As the carrier moves down the floor 12 and arrives at the lower edge 15 of the latter it falls directly down onto the floor 12ª and slides down the latter until it reaches the lower edge 16 of the chute when it drops down into a trough 17 at the front part of the desk 18. Carrier stations 19, corresponding to the groups 5 of tubes, are arranged at the front of the desk in convenient position so that operators seated at these stations may pick up carriers from the trough 17 and perform the necessary transactions. After performing the desired transactions the operator places the carrier in a receiving box 20 in the front edge of the desk from which the carrier drops into a longitudinally extending tube 21. This tube 21 communicates at one end of the desk with a transfer tube 22 which delivers the carriers through a terminal 23 to a despatch desk 24. This desk is provided with a bank of despatch terminals 23ª leading to the various outlying stations and through which the carriers are returned to the sending point. The authorizer's station 11 is also furnished with receiving boxes 25 communicating with a tube 26 which delivers through one of the terminals 23 to the despatch desk 24.

The lower portion of the inclined delivery chute is provided at its opposite ends with inclined deflectors 27 and 28 respectively, which are adapted to intercept carriers sliding down the lower floor 12ª of the chute and to divert them inwardly toward the operators' stations nearest to the adjacent end of the desk.

Additional deflectors 30 and 31 are arranged intermediate of the ends of the chute. Preferably the deflectors 30 and 31 are connected to form a compound deflector of inverted V-shape having its apex 29 directed upwardly. These compound deflectors are preferably movable longitudinally of the desk and in order to hold them in adjusted position the cover member 14 of the lower part of the chute may be provided with a row of openings 32 for the reception of retaining pins 33 adapted to project into suitable openings in the upper edges of the deflector members 30 and 31. Preferably the deflectors are of a vertical thickness substantially equal to the distance between the cover plate 14 and the floor 12ª, and while in most cases the deflectors 27 and 28 will be stationary it is contemplated that they may be movable as well as the deflectors 30 and 31.

While in Fig. 1 I have shown the deflectors as associated only with the lower part of the inclined chute I contemplate the provision of deflectors in the upper part of the chute or in both parts as may be desired, the latter arrangement being indicated in Fig. 6 wherein a V-shaped deflector 50 is shown as supported by the upper floor member 12 of the chute, and a second deflector 51 is shown in the lower part of the chute.

In the operation of the device the cash carriers deposited in the upper part of the chute slide down the floor 12 and then drop onto the floor 12ª along which they tend to move in substantially straight lines toward the lower edge 16 of the latter. If the deflectors 27 and 28, 30—31 were not provided, a carrier arriving through each group 5 of tubes would move in a substantially vertical plane directly from its point of discharge to the trough 17 and would be deposited in front of the corresponding operator. As above described, due to increased activity of certain outlying stations, certain groups of tubes may deliver more than the normal number of carriers. In such case the movable deflectors may be shifted either to the right or left so as to intercept carriers through more or less of the tubes of a given group and to deflect such carriers to stations at the right or left of the station at which they would normally arrive. In extreme cases the deflectors may be so placed as to throw all carriers from a given group of tubes out of their normal path.

Since ordinarily a plurality of the compound V-shaped deflectors will be provided, it is possible by grouping these deflectors to produce almost any desired distribution of the arriving carriers and the number of possible variations may obviously be increased by providing similar movable deflectors in the upper part of the inclined chute.

While I prefer to employ bodily movable deflectors, I contemplate the provision of pivotally supported deflectors adapted to swing to one side or the other or to remain in a neutral position substantially parallel to the normal movement of the carriers along the chute. This arrangement is illustrated in Fig. 7 wherein the deflector 53 is mounted upon a pivot 54 which may be provided with a handle for moving the deflector to the right or left.

While I have shown the deflector devices as arranged in the lower part of a chute of zig-zag construction it is obvious that similar deflectors may be arranged in a chute having but a single downwardly extending run.

I claim:

1. Apparatus of the class described comprising a group of delivery terminals, and a normally stationary deflector disposed in the path of carriers discharged from the terminals of said group, said deflector being bodily adjustable at will to direct all carriers discharged from the terminals of said group either to the right or to the left of said group.

2. Apparatus of the class described comprising a plurality of delivery terminals, an inclined chute positioned to receive carriers delivered by said terminals, and a deflector engageable with carriers moving down the chute, said deflector being movable relatively to the chute to permit segregation of carriers from selected groups of said terminals.

3. Apparatus of the class described comprising a plurality of rows of delivery terminals, an inclined support arranged to receive carriers delivered by the terminals of both rows, a second inclined support receiving carriers delivered from the lower edge of the first support, and a deflector for diverting carriers moving down one of said supports from their normal paths of movement.

4. Apparatus of the class described comprising a desk, a pair of delivery terminals arranged above the desk, one terminal being nearer to the back of the desk than the other, a support arranged to receive carriers delivered by both terminals, said support sloping downwardly toward the rear of the desk, and means for conducting carriers discharged from the lower edge of said support to a point adjacent to the front of the desk.

5. Apparatus of the class described comprising a desk, a pair of delivery terminals arranged above the desk, one terminal being nearer to the back of the desk than the other, a support arranged to receive carriers delivered by both terminals, said support sloping downwardly toward the rear of the desk, and a second inclined support sloping toward the front of the desk and arranged to receive carriers discharged from the lower edge of the first support and to deliver them near to the front of the desk.

6. Apparatus of the class described comprising a desk, a pair of delivery terminals arranged above the desk, one terminal being nearer to the back of the desk than the other, a support arranged to receive carriers delivered by both terminals, said support sloping downwardly toward the rear of the desk, a second support arranged to receive carriers discharged from the lower edge of the first support, said second support sloping downwardly toward the front of the desk, and a deflector device, adjustable bodily transversely of the width of said second support to divert carriers moving down the latter from their normal path of movement.

7. Apparatus of the class described comprising a desk, a pair of delivery terminals arranged above the desk, one terminal being nearer to the back of the desk than the other, a support arranged to receive carriers delivered by both terminals, said support sloping downwardly toward the rear of the desk, a second support arranged to receive carriers discharged from the lower edge of the first support, said second support sloping downwardly toward the front of the desk, and a deflector of inverted V-shape resting upon and adjustable transversely of said second support optionally to divert carriers moving down the latter either to the right or to the left of their normal paths of movement.

8. Apparatus of the class described comprising a plurality of delivery terminals, a fixed support common to the several terminals onto which carriers are delivered by the several terminals and along which the carriers continue to move after delivery, and an adjustable deflector device engageable with carriers moving along said support to divert them from their normal paths of movement.

9. Apparatus of the class described comprising a plurality of delivery terminals, an inclined fixed support arranged to receive carriers discharged from the several terminals and down which the carriers slide, and a deflector for diverting carriers sliding down said support from their normal paths, said deflector being adjustable to intercept carriers from a greater or lesser number of terminals.

10. Apparatus of the class described comprising a plurality of delivery terminals, an inclined fixed support arranged to receive carriers discharged from the several terminals and down which the carriers slide, a deflector at each end of said support, said deflectors inclining downwardly and inwardly toward the center of the support, and a deflector of inverted V-shape intermediate said first deflectors.

11. Apparatus of the class described comprising a plurality of delivery terminals, an inclined fixed support arranged to receive carriers discharged from the several terminals and down which the carriers slide, a fixed deflecting element resting upon the support adjacent to each end of the latter, said fixed deflectors inclining inwardly and downwardly toward the center of the support, and a deflector intermediate said fixed deflectors, said intermediate deflector being adjustable to intercept carriers from optionally different numbers of said delivery terminals and thereby to deflect such carriers from their normal paths.

12. Apparatus of the class described comprising a plurality of delivery terminals, an inclined fixed support arranged to receive carriers discharged from the several terminals and down which the carriers slide, a fixed deflecting element resting upon the support adjacent to each end of the latter, said fixed deflectors inclining inwardly and downwardly toward the center of the support, and a deflector of inverted V-shape intermediate the fixed deflector, said intermediate deflector being bodily adjustable longitudinally of the support.

13. Apparatus of the class described comprising a plurality of delivery terminals disposed in a row, an inclined support disposed below said terminals, the carriers discharged from the several terminals tending to move in substantially rectilinear paths down said support, and a deflecting element inclined relatively to the normal paths of said carriers and engageable with said carriers to divert them from their normal paths, said deflector being bodily movable transversely of said paths.

14. Apparatus of the class described comprising spaced parallel rows of pneumatic transmission tubes, a carrier separator connected to each tube for dividing the carriers into two classes, a belt conveyor disposed to receive carriers of one class delivered by the separators of both rows of tubes, a desk below the separators, a chute arranged to receive carriers of the other class from the separators corresponding to both rows of tubes and to deliver said carriers to the desk, and adjustable deflector means associated with the chute for directing carriers moving down the chute toward one or the other end of the desk.

15. Apparatus of the class described comprising a row of pneumatic despatch delivery terminals a desk disposed below said terminals, a wide covered chute extending the entire length of said row of terminals and adapted to receive carriers delivered by all of said terminals and to conduct them to the desk, and bodily movable deflectors within the chute adapted to divert carriers from their normal paths and thereby to collect carriers from groups of terminals of desired size.

16. Apparatus of the class described comprising a plurality of rows of delivery terminals, a desk disposed beneath said terminals, a horizontally elongate chute arranged to receive carriers from all of said terminals and to conduct them to the desk, and means for separating carriers moving down the chute into a plurality of groups.

17. Apparatus of the class described comprising a plurality of pneumatic despatch terminals, a desk disposed below said terminals, an inclined chute arranged to receive carriers from said terminals and to deliver them at the desk, and adjustable deflectors arranged within the chute for dividing the moving carriers into groups.

18. Apparatus of the class described comprising a pneumatic transmission tube, a separator device connected to the tube for separating carriers into two classes, a belt conveyor for receiving one class of carriers, an inclined chute for receiving carriers of the other class, and a deflector mounted upon said chute intermediate its upper and lower ends to divert carriers from their normal paths along the chute.

19. Apparatus of the class described comprising a plurality of pneumatic despatch terminals disposed in a row, a wide chute arranged to receive carriers delivered by all of said terminals, a desk disposed below the terminals, spaced operators' stations at the side of the desk, and a deflector device engageable with carriers sliding down the chute, said deflector being adjustable to determine from what delivery terminals carriers shall be delivered to a selected station.

20. Apparatus of the class described comprising two groups of parallel rows of pneumatic transmission tubes, a desk extending beneath each group, a separator connected to each tube for separating cash carriers and charge carriers, a belt conveyor disposed above each desk and arranged to receive charge carriers from the corresponding group of tubes, an authorizer's desk, and a chute arranged to receive charge carriers from both belts and to deliver them to said authorizer's desk.

21. Apparatus of the class described comprising two groups of parallel rows of pneumatic transmission tubes, a desk extending beneath each group, a separator connected to each tube for separating cash carriers and charge carriers, a belt conveyor disposed above each desk and arranged to receive charge carriers from the corresponding group of tubes, a wide chute extending along beneath each group of tubes and arranged to receive cash carriers delivered by the tubes of said group and to transfer them to the corresponding desk, deflector means associated with each chute for segregating the carriers into groups, said deflector means being adjustable to vary the size of said groups, an authorizer's desk, and chutes arranged to receive charge carriers from each belt and to deliver them to said authorizer's desk.

Signed by me at Syracuse, New York, this seventeenth day of August, 1925.

JAMES G. MACLAREN.